E. B. MEYROWITZ.
EYEGLASSES.
APPLICATION FILED MAR. 27, 1909.

943,836.

Patented Dec. 21, 1909.

Witnesses:

Inventor
Emil B. Meyrowitz
By his Attorneys

UNITED STATES PATENT OFFICE.

EMIL B. MEYROWITZ, OF NEW YORK, N. Y., ASSIGNOR TO THE MEYROWITZ MANUFACTURING CO., A CORPORATION OF NEW JERSEY.

EYEGLASSES.

943,836.

Specification of Letters Patent.   Patented Dec. 21, 1909.

Application filed March 27, 1909. Serial No. 486,085.

*To all whom it may concern:*

Be it known that I, EMIL B. MEYROWITZ, a citizen of the United States, residing at the city of New York, in the borough of Manhattan and State of New York, have invented certain new and useful Improvements in Eyeglasses, of which the following is a full, clear, and exact description.

My invention relates to eyeglasses, and includes features of construction by which the lenses are made adjustable with respect to one another and with respect to the bridge, without disturbing the position of the nose engaging clips or guards. Forms of adjustment for the lenses have hitherto been proposed, but have commonly had the defect that adjustment of the lenses with respect to the bridge produced a corresponding displacement of the nose engaging clips or guards, so that in adjusting the glasses to suit the eyes and facial configuration of a patient, the clips were thereby brought out of their correct position on the patient's nose.

The present invention secures an adjustment of the glasses with respect to the bridge by the use of a ductile spiral metallic fastening employed in lieu of the usual posts. The ductile nature of this metallic fastening permits it to be elongated or contracted, or displaced laterally or angularly, thereby securing a corresponding adjustment of the lens which is supported by this form of post.

The invention further consists in the features of construction and combination as hereinafter set forth and claimed.

Figure 1:
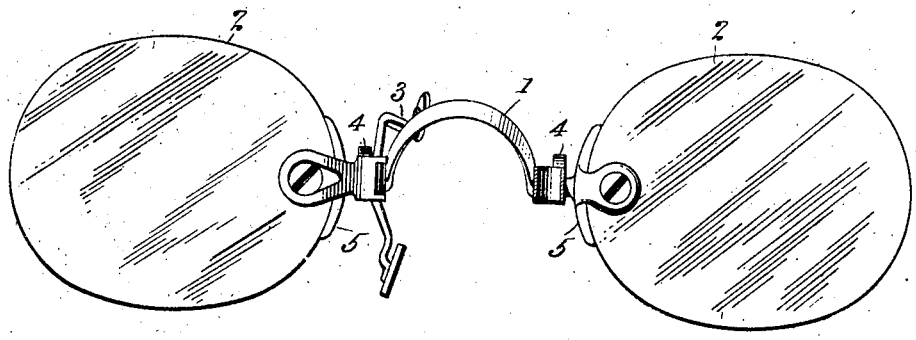
Figure 2:
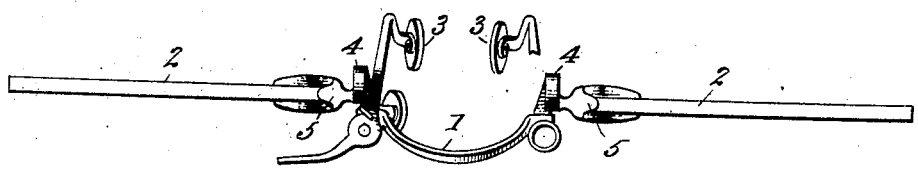
Figure 3:
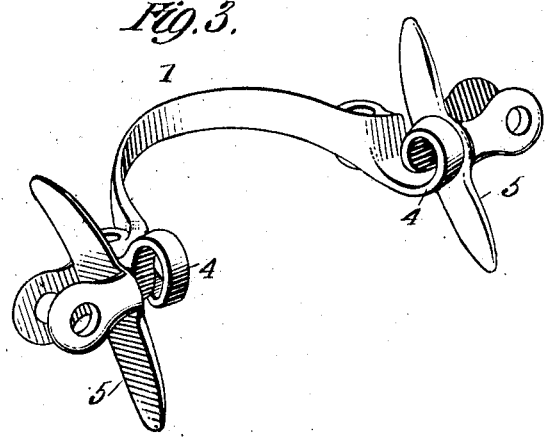
Figure 4:
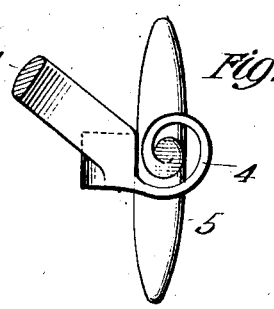

In the drawings: Figure 1 is a front elevation of a pair of eyeglasses embodying the principles of my invention; Fig. 2 is a top or plan view; Fig. 3 is a view of the bridge with its attached posts and the lens engaging straps, and Fig. 4 is a sectional view of the same taken transversely through the center of the bridge.

Referring to the drawings in which like parts are designated by the same reference sign, 1 denotes the bridge and 2 the lenses of a pair of glasses.

3 denotes nose engaging clips or guards which may be pivoted or resiliently fixed to the bridge. The only essential characteristic of these clips in their relation to the bridge is that they have a connection which is inside of and independent of, the lens supporting posts hereinafter described. In other words, the clips 3 are permanent in their relation to the main portion of the bridge which saddles the nose of the wearer. The lenses 2 are, however, made adjustable in their relation to the bridge 1 and the clips 3, whereby the positions of the lenses may be adjusted to suit the eyes and face configurations of the particular patient.

4 denotes posts fixed to the bridge 1 at points beyond or outside the locations of the attachment of the clips 3. The posts 4 are simply formed of spiral ductile fairly stiff or rigid metal and may be integral with the bridge 1 if desired. I have illustrated the posts 4 in the form of flat spirals secured at their outer extremities to the bridge and at their inner extremities to the straps 5 which support the lenses. The transverse section of the material of these flat spirals 4 is illustrated as generally rectangular in the drawings although this is obviously not essential. These supporting posts 4 are not intended to be resilient and have no spring action whatever. The nature of the material and the form of the spirals is such as to get as great rigidity as possible, consistent with the various adjustments which are possible with the ductility of the material. It may be mentioned that silver is a suitable ductile material having the necessary rigidity and freedom from resiliency which is required in these spiral posts 4. The adjustments which may be attained by the foregoing structure are various. For example, to set the lenses 2 wider apart or more separated, it is merely necessary to draw the posts 4 outward into a sort of conical helix. The lenses may be tilted at various angles with respect to the bridge by simply making the posts 4 more or less closely spiraled as the case may demand. The lenses may also be off-set frontward or rearward with respect to the bridge by opening out and flattening the material of the spirals 4. For example, the lenses may be set far to the rear by uncoiling and flattening out the main portion of the spiral. Of course, the foregoing adjustments can only be made within certain prescribed limits, but they are ordinarily sufficient for the purposes required.

What I claim, is:—

1. In a pair of eyeglasses, a bridge, nose engaging clips mounted in a fixed position on said bridge, spiral posts extending from said bridge beyond or outside of the points of attachment of said clips, and lenses fixed to said posts.

2. In a pair of eyeglasses, a substantially rigid bridge, nose-engaging clips mounted in a permanent position on said bridge, spiral posts of ductile but non-resilient material fixed to said bridge beyond or outside of the points of support of said clips, and lenses fixed to said posts.

3. In a pair of eyeglasses, a bridge, clips mounted on said bridge, flat spiral posts integral with said bridge and extending therefrom at points beyond or outside the location of said clips, and lenses fixed to the extremities of said posts.

4. In a pair of eyeglasses, a bridge, clips mounted on said bridge, flat spiral posts comprising material of rectangular transverse section fixed to said bridge at an outside convolution of the spirals, straps secured to an inner extremity of the spirals, and lenses attached to said straps.

In witness whereof, I subscribe my signature, in the presence of two witnesses.

EMIL B. MEYROWITZ.

Witnesses:
WILLIAM P. HALL,
WM. M. STOCKBRIDGE.